United States Patent
Kosler et al.

(10) Patent No.: US 10,458,087 B2
(45) Date of Patent: *Oct. 29, 2019

(54) SYSTEM AND METHOD FOR DEWATERING SEDIMENT PONDS

(71) Applicant: AECOM Technical Services, Inc., Austin, TX (US)

(72) Inventors: Steven Kosler, Austin, TX (US); David Seeger, Austin, TX (US); George Richard Bird, Wildwood, MO (US)

(73) Assignee: AECOM Technical Services, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/201,379

(22) Filed: Nov. 27, 2018

(65) Prior Publication Data

US 2019/0112774 A1 Apr. 18, 2019

Related U.S. Application Data

(63) Continuation-in-part of application No. 15/652,740, filed on Jul. 18, 2017, now Pat. No. 10,144,892.

(Continued)

(51) Int. Cl.
| | |
|---|---|
| *E02B 11/02* | (2006.01) |
| *F26B 5/12* | (2006.01) |
| *B01D 29/52* | (2006.01) |
| *B01D 36/00* | (2006.01) |
| *B01D 29/11* | (2006.01) |

(Continued)

(52) U.S. Cl.
CPC ............ *E02B 11/02* (2013.01); *B01D 29/114* (2013.01); *B01D 29/52* (2013.01); *B01D 36/003* (2013.01); *B01D 43/00* (2013.01); *F26B 5/12* (2013.01); *F26B 9/10* (2013.01); *C02F 11/121* (2013.01); *C02F 11/128* (2013.01); *C02F 2301/063* (2013.01); *E02B 11/00* (2013.01)

(58) Field of Classification Search
CPC .......... E02B 11/02; F26B 5/12; B01D 29/114; B01D 29/52; B01D 36/003; B01D 43/00; C02F 11/121
USPC .......................................................... 34/381
See application file for complete search history.

(56) References Cited

U.S. PATENT DOCUMENTS 6,105,273 A * 8/2000 Johanson .................. B01J 8/08
    34/267
8,673,156 B2 * 3/2014 Griffin ...................... B01D 1/14
    210/175

(Continued)

FOREIGN PATENT DOCUMENTS

WO WO-2018022900 A1 * 2/2018 ................. C10L 5/04

*Primary Examiner* — Stephen M Gravini
(74) *Attorney, Agent, or Firm* — DuBois, Bryant & Campbell, LLP; William D. Wiese (57) ABSTRACT

The installation of one or more prefabricated drains beneath the surface of sediment in a sediment pond utilizing suction or a vacuum to withdraw water from the sediment material to lower the water level down to the level of the prefabricated drains below the pond surface. Dewatering may be coupled with imparting vibrations to the material to further promote both additional dewatering and compaction of the sediment material in the pond. A suitably graded bottom ash, fly ash, sand or large-diameter-solid particle or sediment layer may be added on top of the horizontal drains to enhance dewatering of finer sediment material.

30 Claims, 6 Drawing Sheets

Related U.S. Application Data

(60) Provisional application No. 62/368,029, filed on Jul. 28, 2016.

(51) Int. Cl.
    *B01D 43/00*       (2006.01)
    *C02F 11/121*     (2019.01)
    *C02F 11/128*     (2019.01)
    *F26B 9/10*        (2006.01)
    *E02B 11/00*      (2006.01)

(56) References Cited

U.S. PATENT DOCUMENTS

| | | | |
|---|---|---|---|
| 8,801,904 B2 * | 8/2014 | Miller | C10B 7/00 202/117 |
| 8,926,221 B2 * | 1/2015 | Hwang | B09B 1/006 405/129.57 |
| 9,341,410 B1 * | 5/2016 | Griffin | F26B 17/00 |
| 10,144,892 B2 * | 12/2018 | Kosler | C10L 5/04 |

* cited by examiner

SYSTEM AND METHOD FOR DEWATERING SEDIMENT PONDS

PRIORITY STATEMENT UNDER 35 U.S.C. § 119 & 37 C.F.R. § 1.78

This non-provisional application is a continuation in part of U.S. patent application Ser. No. 15/652,740 filed Jul. 18, 2017, issued as U.S. Pat. No. 10,144,892 on Dec. 4, 2018, in the names of Steven Kosler, David Seeger, and George Richard Bird entitled "SYSTEM AND METHOD FOR DEWATERING COAL COMBUSTION RESIDUALS" which claims priority based upon prior U.S. Provisional Patent Application Ser. No. 62/368,029 filed Jul. 28, 2016, in the names of Steven Kosler, David Seeger, and George Richard Bird entitled "SYSTEM AND METHOD FOR DEWATERING COAL COMBUSTION RESIDUALS," the disclosures of which are incorporated herein in their entirety by reference as if fully set forth herein.

FIELD OF INVENTION

This invention relates to methods and systems for the dewatering of sediment ponds, such as those that result from the closure of coal combustion residuals (CCR), sometimes referred to as coal combustion products (CCP), fly ash, gypsum, calcium sulfite, bottom ash, pyrites, ponds or impoundments and more specifically, a method and apparatus for dewatering and consolidating sediment in sediment ponds to reduce its volume, water content, and/or to stabilize its physical properties for disposal, closure or reuse of the sediment.

BACKGROUND OF THE INVENTION

Industrial activities generate sediments and sludge that are often disposed of in ponds or impoundments or managed in another fashion. The United States Environmental Protection Agency estimates that, in the 1990s, there were approximately 18,000 industrial surface impoundments that manage sediments in use throughout the United States. These surface impoundments were present at about 7,500 facilities located primarily east of the Mississippi River and in Pacific Coast states.

Surface impoundments are used by many industrial sectors, such as manufacturing, bulk petroleum storage, air and truck transportation, waste management, and national security. The wastewaters and sediments managed in these surface impoundments are primarily from manufacturing and washing processes and certain contaminated stormwaters.

Industrial impoundments vary greatly in size, from less than a quarter of a hectare (⅓ of an acre) to several hundred hectares. The environmental and human health issues plaguing sediment impoundments are well understood. In general, sediment in sediment ponds, such as CCR material, behaves similarly to typical sand, silt and clay sediments, and their geotechnical properties are similar depending on the size and classification. Therefore, the performance of such sediments will be similar and vice versa.

As will be appreciated by those skilled in the art, the properties inherent in CCR residuals such as fly ash, gypsum, calcium sulfite, bottom ash, pyrites and the like are indicative of, and consistent with, the properties of other sediments that may be found in sediment ponds. For example, sediments are removed periodically from the bottom of lakes, rivers harbors and other water bodies as a routine and necessary means to keep our waterway infrastructure operational due to the natural process of sand and silt washing downstream, gradually filling channels and harbors. Once again, these sediments have properties and characteristics that are similar to those described above, and the removal of the dewatering of these sediments is within the scope of the present disclosure.

In one example of the type of sediment contemplated herein, past coal-fired generation activities have resulted in CCR sediments in disposal ponds or impoundments. These CCR ponds require closure to mitigate their impact on the neighboring environment and human or animal health. Closure is also now required by U.S. environmental regulation. However, as is also typical with other sediment ponds, to facilitate closure, the CCR ponds are sometimes dewatered by pre-drainage of the CCR to enhance strength and stability of the material and thereby provide a stable surface on which to operate earthmoving and grading equipment. If pre-drainage (e.g., by pumping wellpoints installed in the CCR to lower the groundwater table) does not sufficiently improve strength and stability of the in-place CCR due to its drainage properties, it becomes necessary to improve CCR strength and stability with admixtures such as quicklime, dry fly ash, or Portland cement; evaporative drying in place, or by dredging or excavating the CCR, dewatering it to consolidate it and improve its strength and handling characteristics, and landfilling it either in the same place or by hauling it a different disposal location.

Sediment ponds are generally known to be unstable when saturated. For example, when saturated, CCR is subject to shear strain, it densifies and expels water, resulting in a near total loss of shear strength. In this state, the material becomes a viscous fluid and may begin to slide or flow. This process may result in overtopping of impoundments and makes excavation and handling difficult to impossible. Reducing the water content in a sediment pond by only a few percentage points has a dramatic effect on its behavior, allowing stable, near vertical cuts suitable for mass excavation. The methods and systems described herein are useful in any sediment pond requiring stabilization by dewatering in order to manage or close the pond.

Dewatering methods include both mechanical dewatering and geotube dewatering. In mechanical dewatering, dredged CCR is pumped to a mechanical dewatering unit (e.g., a centrifuge, a belt press, or a filter press), dewatered, and the filtered CCR (filter cake) is placed in a landfill. Often, the filtered CCR cake requires solidification/stabilization because it cannot support earthwork equipment that is used on the surface of landfills.

Geotube dewatering uses geotubes for dewatering. Geotubes are large filter bags made of geotextile. Dredged CCR is pumped into a geotube and the water is allowed to drain, leaving CCR solids in the geotube. After the geotube is filled with dredged CCR, it is allowed to drain for some time. When the geotube collapses as water is drained, more dredged CCR is pumped into the geotube. After cycles of filling and draining, the geotube is filled with "drained" CCR. The drained CCR may be dewatered further, if desired, by evaporative drying for several weeks. The dewatered CCR may be taken off site for disposal or disposed of in an on-site landfill.

Consolidation refers to a process of subjecting the sediment to a load so that the sediment undergoes volume reduction and strength gain as a result of water being effectively forced out of the loaded sediment volume. Since most sediments do not allow water to flow out easily due to its very low hydraulic conductivity, drainage pathways are provided in the sediment volume to accelerate consolidation.

The most common way of providing drainage pathways is to insert prefabricated drains vertically into sediment in the sediment pond. The prefabricated drains consist of a plastic core wrapped with geotextile filter which, when installed in the sediment, facilitates the flow of water into the drain and to the surface of the ground. Prefabricated drains can consist of flat plastic cores with a geotextile envelope, commonly installed using a hollow rectangular mandrel that is pressed into the ground, or perforated circular plastic pipe/tube surrounded by a geotextile envelope, installed by drilling an open hole with drilling fluid, or jetting or driving an open-ended temporary steel casing/tube or advancing a continuous hollow auger and inserting the perforated plastic pipe or tube and geotextile envelope before the temporary casing/tube or hollow auger is extracted.

SUMMARY OF THE INVENTION

A method and system for dewatering and consolidating sediments in a sediment pond utilizing horizontal drains that are installed before, during or after the sediment is added to the pond. One or more horizontal drains may be installed below the surface of the sediment or on the surface of existing sediment to which additional sediment material is added. The drain or drains may be connected to a vacuum pump via collector hoses or pipe, and a collection header pipe. The vacuum pump operation facilitates the removal of water from the sediment, consolidates the settled material and reduces its volume, enabling continued discharge of dredged sediment or disposal of the material by removal and landfilling or capping (i.e., closing the material in place).

In some embodiments, imparting vibrational energy to the surface layers of the sediment will improve compaction of the sediment to provide additional strength to the sediment for supporting earth working equipment that may be required to be driven on the surface of the pond for the purpose of closing it. Vibrational energy may be supplied by transporting or hauling compaction equipment or driving vehicle-based equipment across the surface. When more than one horizontal drain is installed, successive installation of horizontal drains within accumulating sediment and consolidation by vacuum pumping may continue until the disposal pond is filled with consolidated sediment. In the case of closing the pond in place, vacuum pumping may be continued for some period after final cover installation to enhance containment performance by over-consolidation. The horizontal drain system may also be used to deliver liquid reagents for sediment treatment or to circulate water for flushing. The method enables the disposal pond to be on land or under water below the original sediment line.

Additionally in some embodiments, the prefabricated drains may be laid out on a surface of ground or other sediment and a suitably graded 3-inch to 4-foot thick layer of bottom ash, fly ash, sand or larger-diameter-solid particles or sediments may be added on top of the horizontal prefabricated drains. This can be achieved via mechanical placement or dredging the material from a nearby pond over the drains. Large diameter solid particles will inherently settle atop the one or more drains as the material is placed over the drains as the large particles are more mobile in gravity settling. In this manner, finer sediment may be more efficiently dewatered using the above described method of vacuum consolidation dewatering. This layer of ash or sand over the prefabricated drains filters the water and allows it to flow through without carrying the very fine sediment particles to the surface of the prefabricated drains. When a geotextile drain covering, or filter jacket, is used, finer sediment particles may have a tendency to plug the covering, and the layer of suitably graded ash or sand prevents that from happening.

The foregoing has outlined rather broadly certain aspects of the present invention in order that the detailed description of the invention that follows may better be understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The present invention is directed to improved methods and systems for, among other things, system and method for dewatering sediments, including coal combustion residuals. The configuration and use of the presently preferred embodiments are discussed in detail below. It should be appreciated, however, that the present invention provides many applicable inventive concepts that can be embodied in a wide variety of contexts other than system and method for dewatering coal combustion residuals. Accordingly, the specific embodiments discussed are merely illustrative of specific ways to make and use the invention, and do not limit the scope of the invention.

Embodiments of the present invention include the installation of one or more prefabricated drains in a horizontal, generally co-planar pattern below the surface of sediment in a sediment pond and putting suction or a vacuum on the horizontal drains to withdraw water from the sediment material to lower the water level down to the level of the one or more prefabricated drains below the sediment surface.

In some embodiments the dewatering may be accomplished by one or more drains of varying size, shape, orientation, and/or horizontal and vertical placement, depending on static or dynamic characteristics of the sediment pond, such as its size, water level, saturation, and/or composition, or as otherwise dictated by the dewatering objectives. For example, drains may be installed either co-planar or at varying depths depending on the change in surface elevation of the material and the scope of the dewatering attempting to be accomplished. Specifically, as discussed elsewhere, a single drain may be installed if the pond is small or if the drain's capacity is sufficiently large to handle the scope of the work. Alternatively, a plurality of more than one drain may be desirable if the scope of work involves dewatering at various depths within the pond sequentially or simultaneously. In other embodiments, this dewatering may be coupled with imparting vibrations to the material to further promote both additional dewatering and compaction of the sediment material in the pond. In addition, a suitably graded bottom ash, fly ash, sand or large-diameter-solid particle or sediment layer may be added on top of the drains to enhance dewatering of finer sediment material.

Various embodiments include the dewatering of sediment ponds with a process comprising a combination of one or more of (1) installing one or more prefabricated drains beneath the surface of the existing sediment pond to dewater and vacuum consolidate the entire pond or installing one or more drains in a sectioned-off, dewatering area within an existing sediment pond; (2) installing prefabricated drains under free water on top of sediment or beneath the surface of the sediment to a depth in the range of 0 to 20 ft. below the surface of the sediment; (3) installing prefabricated drains under sediment or under sediment and free water through: (a) horizontal drilling, (b) knifing with mechanical equipment, (c) knifing with water jets, or (d) trenching; (4) adding a layer of 3-inch to 4-foot thickness of suitably graded bottom ash, fly ash, sand or suitable large-diameter-solid particles or sediments to aid in the dewatering of finer sediment material; and (5) imparting vibrational energy (mechanical vibration) to material to compact the sediment and re-liquefy the material to enhance dewatering of sediment, and, in some embodiments, performing mechanical vibration and vacuum dewatering in cycles or continuous vacuum dewatering and imparting vibration to the sediment pond in cycles.

For example, low ground pressure equipment may be driven over the top of the sediment to impart vibration while the vacuum dewatering is operating continuously or intermittently after vibration activities are complete. As noted above, a single drain may be sufficient to dewater sediment ponds having a long, narrow surface impoundment. Additionally this could be the case if there is a particular area of concern within an impoundment for which embodiments of the present invention are utilized solely for that area of concern and a single drain is sufficient to impact the entire area of concern. Ultimately, the number of drains is a function of the capacity and quantity of sediments in the scope of work and, when more than one drain is required, the number of drains is a function of the geometry of the volume in the scope of work. While a long narrow sediment pond may be sufficiently drained by a single drain, a large impoundment may require a drainage system wherein various drains and vacuum systems are required and installed in the most cost effective manner to adequately drain the pond.

In another embodiment, multiple drains may be installed at various depths when used in sediment having higher hydraulic conductivity or in a particularly contaminated area of concern in order to either improve draining or if a specific remedial activity is required for the contaminated area. For example, impoundments often are recipients of various different waste sediments, and can be layered into the impoundment over time as their disposal is not always continuous. Therefore, for example, a sediment pond may have high hydraulic conductivity material in one layer that is covered by a second layer of low hydraulic conductivity material. In this instance, it would be beneficial for one or more drains to be installed specifically at the depth of the high hydraulic conductivity material to dewater the material and surrounding material more effectively, much like the benefit of installing a suitably graded larger particle bottom ash or other sediment over the drain would also improve performance.

Installing the drains in the targeted high hydraulic conductivity zones may require the drains to be installed at various depths throughout the sediment material of concern and not specifically in a co-planar fashion and, by installing the drains in this manner the performance of the drainage system would increase. For the same reasons, a sediment pond may have remedial zones in which waste of a particular substance was generated and targeted for remedial activity in which delivering liquid reagents to remediate the sediment would also promote the need to install the drains in a targeted zone and not necessarily in a co-planar fashion at the same elevation. This would improve performance as such drains would be more efficient in reagent delivery.

Figure 1:
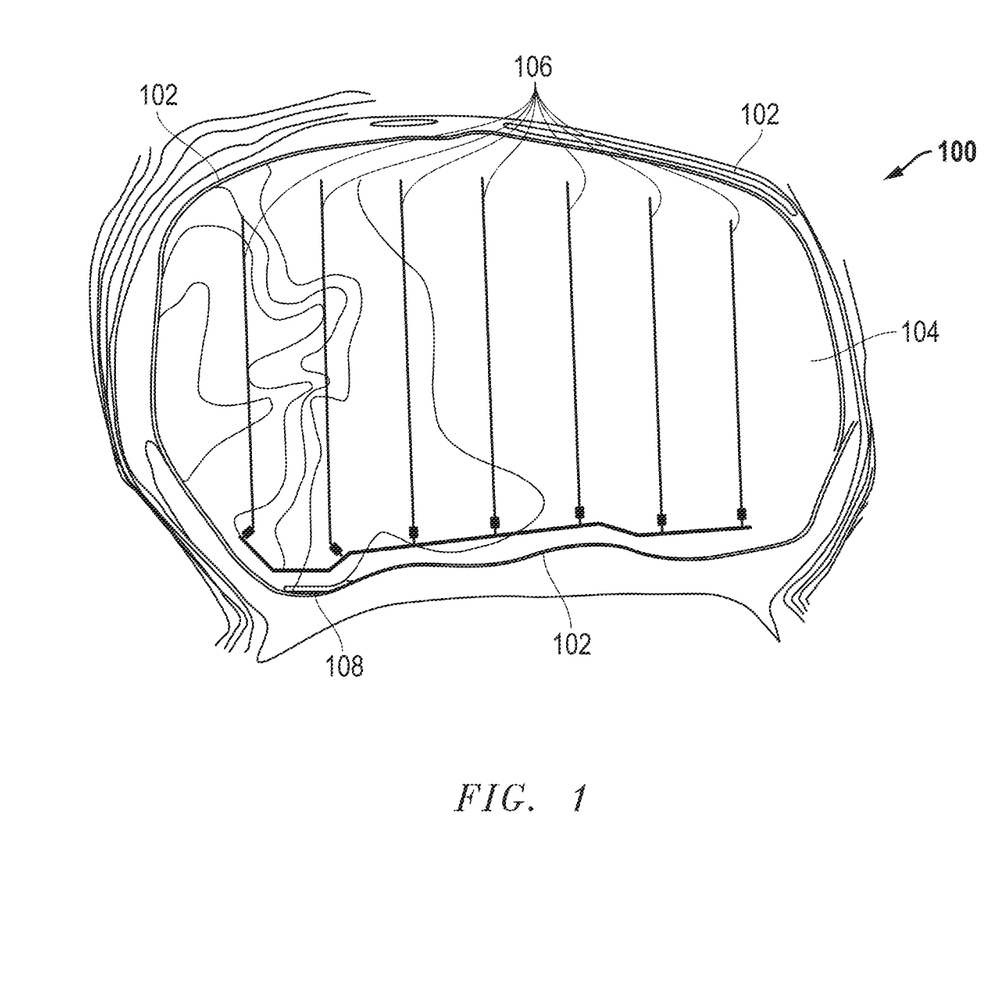
FIG. 1 is a topological view of a sediment pond having one embodiment of the horizontal drains of the present invention.

Referring now to FIG. 1 which shows a topological view of a sediment pond 100 having a retaining berm or dike 102 to hold the sediment 104. Sediment is discharged to the pond 100. Solids in the sediment 104 settle out at the bottom and the thickness of the settlement at the bottom of the sediment pond 100 gradually increases over time. In this embodiment, a plurality of co-planar drains 106 are installed in the sediment pond 100. As discussed above, the number and configuration of drains may vary depending on the specific circumstances the hydraulic conductivity of settled sediment. At least one vacuum pump 108 is hydraulically connected to the plurality of co-planar drains 106.

In some embodiments, a plurality of co-planar drains are installed beneath the surface of the sediment 104 and in other embodiments, a plurality of co-planar drains 106 are placed on top of the surface of the sediment 104 and sediment 104 from other locations in the sediment pond 100 is subsequently dredged or processed to cover the plurality of co-planar drains 106. The plurality of co-planar drains 106 may be wick drains used for consolidation of soft clay soils or perforated, flexible tube drains wrapped with geotextile.

In other embodiments, a single drain is installed beneath the surface of the sediment 104 and in other embodiments, a single drain is placed on top of the surface of the sediment 104 and sediment 104 from other locations in the sediment pond 100 is subsequently dredged or processed to cover the drain. Once again, the drain may be a wick drain used for consolidation of soft clay soils or perforated, flexible tube drains wrapped with geotextile.

Referring now back to the embodiment shown in FIG. 1, wherein the plurality of co-planar drains 106 are hydraulically connected to a vacuum pump 108. The operation of vacuum pump 108 exerts suction to and through the plurality of co-planar drains 106. This vacuum suction extracts water from the sediment 104 surrounding the plurality of co-planar drains 106, leading to consolidation of the sediment 104. As water is removed from the sediment 104, the thickness of settled sediment 104 decreases and more capacity is created in the sediment pond 100.

Figure 2:
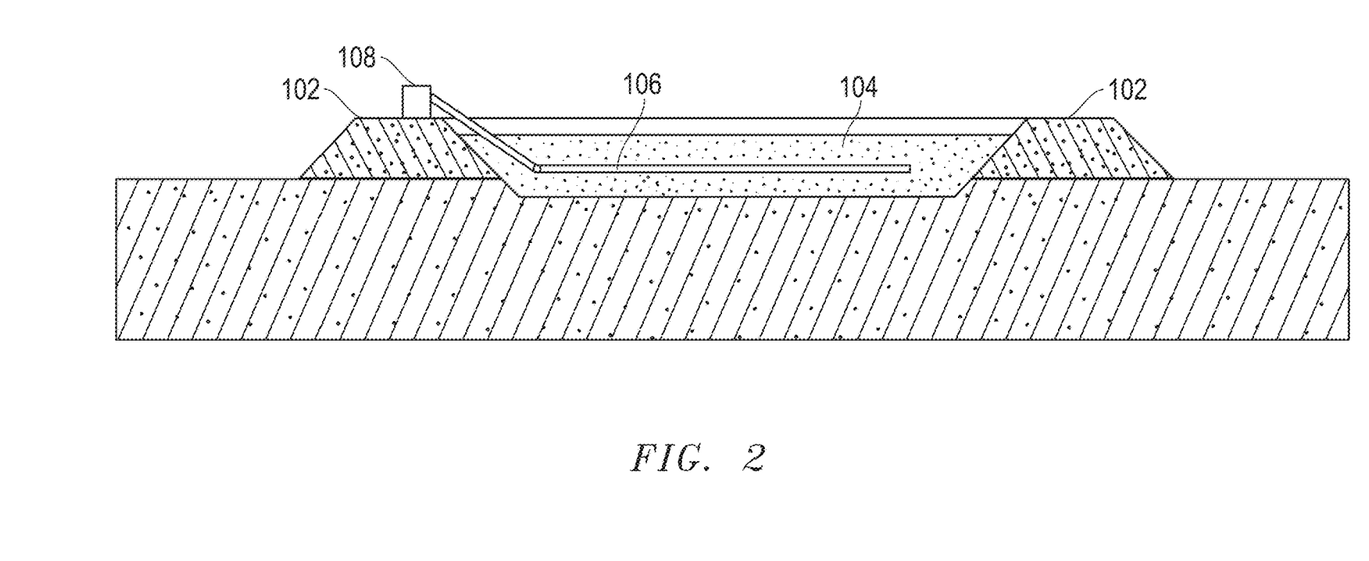
FIG. 2 is a profile of a typical sediment pond having one embodiment of the horizontal drains of the present invention shown from the side view.
Figure 3:
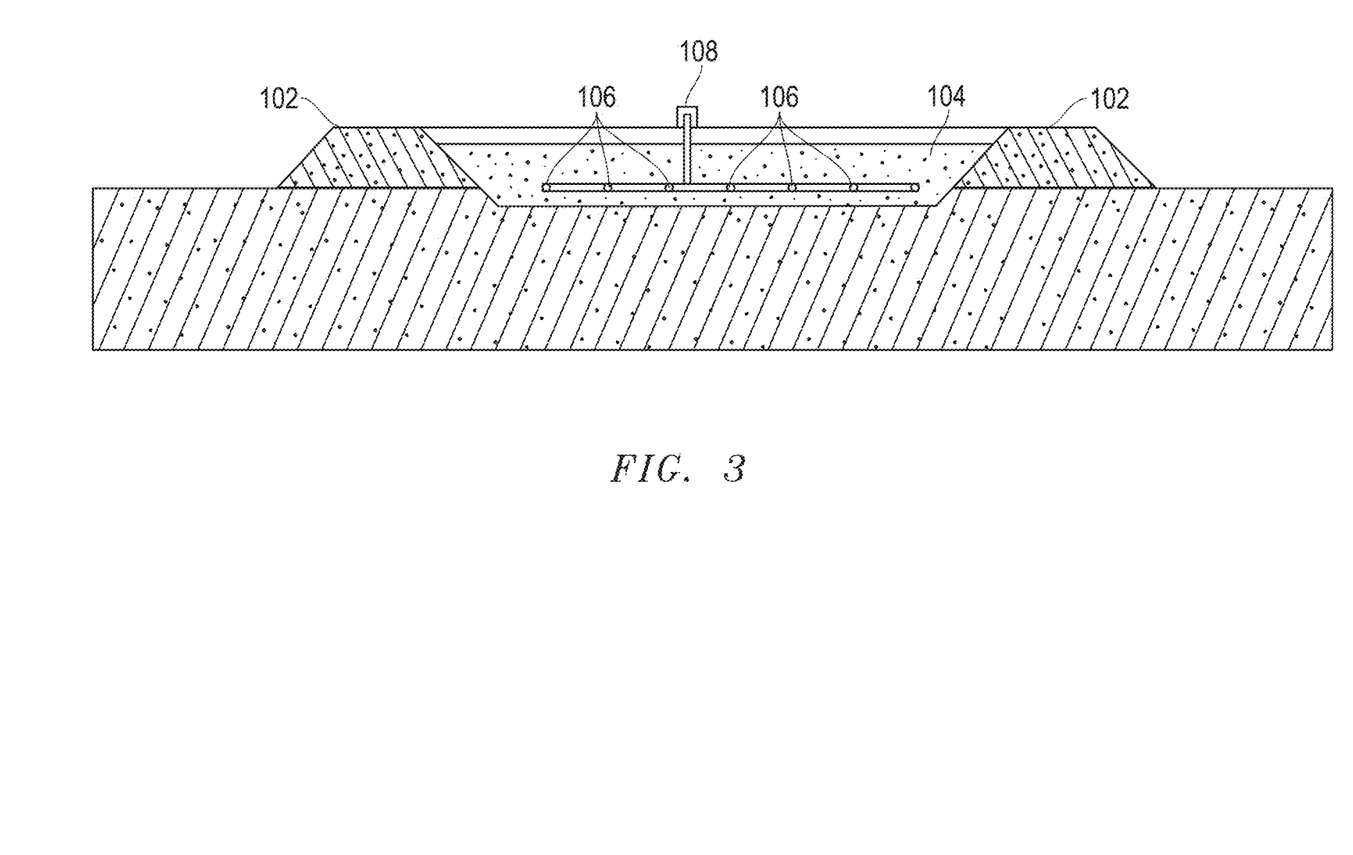
FIG. 3 is a profile of a typical sediment pond having one embodiment of the horizontal drains of the present invention shown from the end view.

FIG. 2 shows a profile of a typical sediment pond 100 having one embodiment of the plurality of co-planar drains 106 of the present invention shown from the side view, and FIG. 3 is a profile of a typical sediment pond having one embodiment of the horizontal drains of the present invention shown from the end view.

To demonstrate the efficacy of various embodiments of the present invention, CCR material was acquired from a CCR pond primarily composed of fly ash. The CCR material was placed in a sample container having a horizontal prefabricated drain installed at the bottom of the unit. The CCR was re-mixed or re-slurried in the sample container as received in the lab. The re-mixed CCR sample had a starting weight percent solids of 63.3% where the calculation was:

(weight of dry solid/total weight of starting slurry sample)*100=weight percent solids The starting CCR material that was added to the sample container was slurry that flowed easily. The re-mixed slurry sample was poured into the sample container and the horizontal prefabricated drain was attached to a vacuum pump that was used to draw out the water from the CCR material. After some time, the water being drawn out of the unit slowed to drops and then stopped. At that point, vibrational energy was imparted to the container by vibrating the sides of the container. The vibrational energy caused the seemingly somewhat dry solids to re-liquefy or re-slurry. Additional water could then be vacuumed from the unit. At the end of the test when the CCR had been dewatered the CCR solids were at 82-83 weight percent solids. These solids are suitable for excavating and disposal or additional pond closure activities.

In a second demonstration of vacuum dewatering and consolidation using horizontal drains, a field demonstration was undertaken in a test area that was constructed on location in a coal ash pond at a coal-fired power plant. The horizontal test area covered approximately 20-30% of the entire larger test area that was separated from the overall pond. There were two test areas, so two different types of drains could be tested in separate areas that were each approximately 20 ft. wide and 200-300 ft. long where the horizontal drains were laid out on the same elevation, i.e., co-planar. Once laid down, CCR (fly ash in this case) was dredged and filled into the test area to a depth of approximately 5 ft. over the horizontal drains. After filling the test area, a pump was used to successfully pump well in excess of 3000 gallons of water out of the horizontal drains across 3 days. On the third day, vibrational energy was imparted to the CCR surface by driving a heavy amphibious hydraulic excavator back and forth across the surface of the CCR pond both over the drains and in areas of the pond not over the drains. The surface over the drains was stronger than the surface not over the drain as described in the following results.

Vane shear data were recorded and indicated general higher results for locations over the horizontal drains as compared to those locations not located over the drains. The average of results for over the drains was 651 PSF (pounds per square foot) and for the locations not over the drains was 480 PSF. The average results are shown in the table below.

| Vane Shear Measurement Location | Average (PSF) | Range (PSF) | No. of Vane Shear Measurement Locations | No. of Average Vane Shear below 500 PSF |
| --- | --- | --- | --- | --- |
| Over the drains | 651 | 353-1016 | 13 | 2 |
| Outside of drain installation area | 480 | 435-566 | 3 | 2 |

Only two of the thirteen averages for each vane shear location made over the horizontal drains were below 500 PSF, compared with 2 of the 3 averages for each vane shear location made not over a horizontal drain. The vane shear results indicate that the fly ash over the drains has significantly higher strength (+36%) than the fly ash not over the drain area. The average vane shear strengths measured in the drain areas were consistently in the 500 to 700 PSF range. Based on this result, we conclude that repeated compaction and horizontal drain operation would further increase the vane shear strength of the fly ash.

Holes were dug by an excavator at the CCR pond site approximately two weeks after the demonstration test was completed. A long-reach excavator was used to dig large holes in the ash at locations above the drains and at locations not above the horizontal drains to determine if any differences in the samples could be observed. Primarily the intention was to investigate the thickness of the top dry "crust" of the fly ash, the ash stability, and wetness. In general the ash over the horizontal drains was dry and stable down to four to five feet below the surface and the ash not over the drains was not as dry nor as stable, and the crust at those locations was only one-half to two feet thick.

Figure 4:
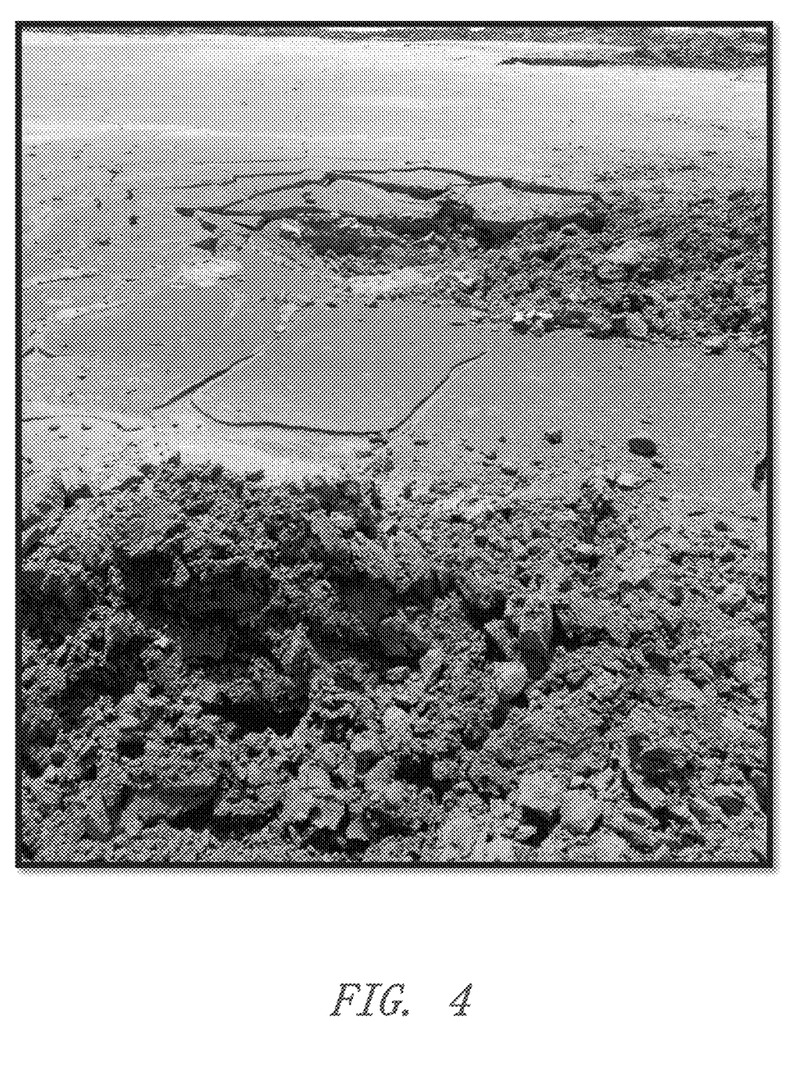
FIG. 4 is a photograph of a hole dug at a point in a dewatered CCR pond approximately 15 feet away from the horizontal drain in which the crust is one to two feet thick and the CCR is wet underneath.
Figure 5:
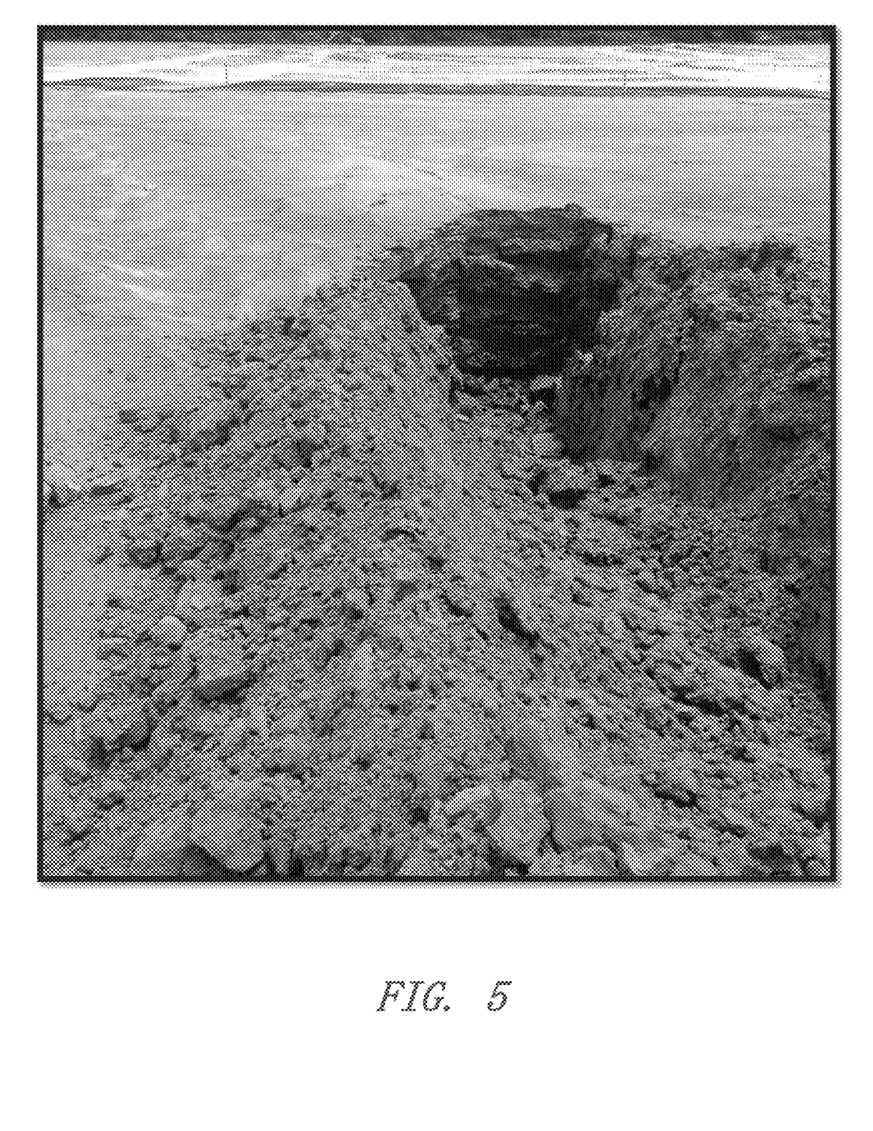
FIG. 5 is a photograph of a hole dug at a point between two different types of horizontal drains in which the CCR is dry all the way to the bottom of the hole, approximately five feet deep, at the drain elevation.
Figure 6:
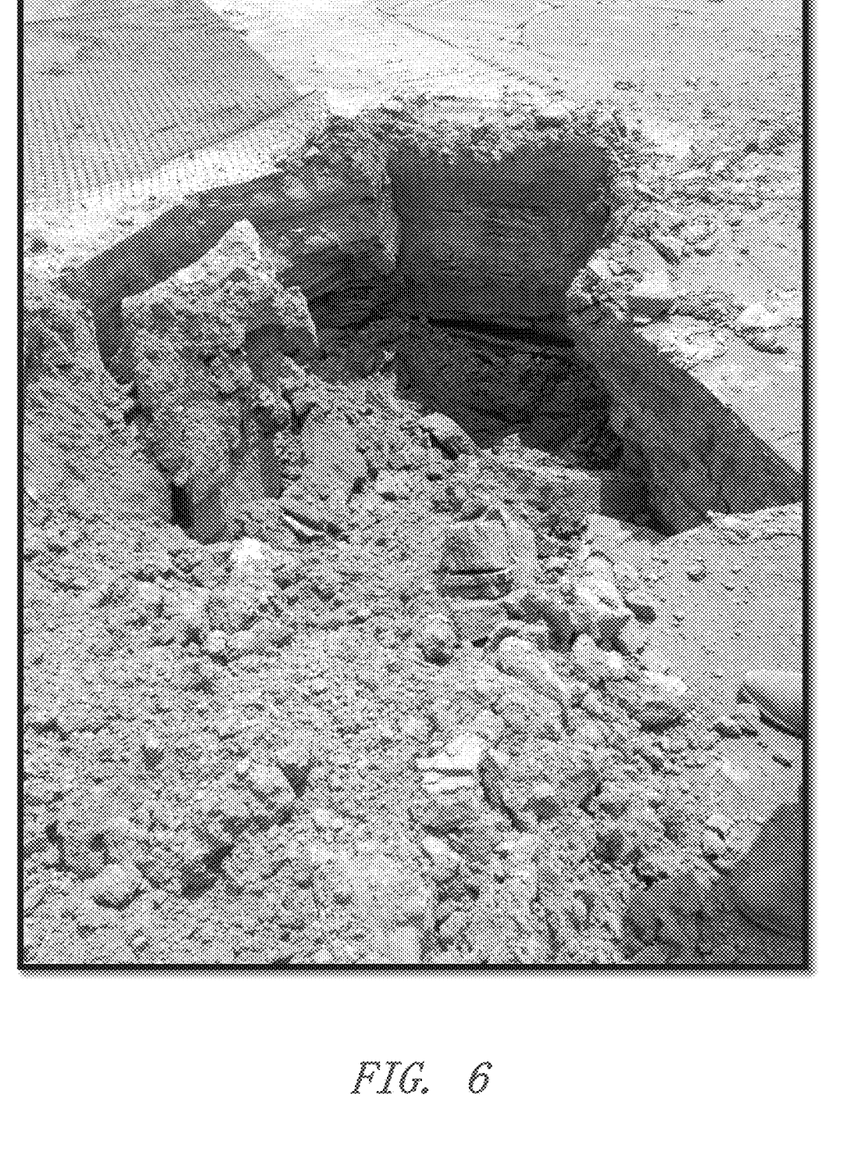
FIG. 6 is a photograph of a hole dug over the top of a horizontal drain in which the CCR is dry all the way to the bottom of the hole, approximately five feet deep, at the drain elevation.

Referring now to FIG. 4 which shows a photo of two holes that were dug by a long reach excavator in areas not over the prefabricated drains, to FIG. 5 which shows a hole dug between the drain test sites, and to FIG. 6 which shows a hole dug over a horizontal test drain. The holes in FIG. 4 which are not over or near the test drains show unstable fly ash and are moister when compared to the photos shown in FIG. 5 which was taken of the hole dug between the drain test sites. The holes shown in FIG. 6 that are over the horizontal drains are very stable and dry down to four to five feet below the surface.

Generally speaking, the figures demonstrate the effect of dewatering using horizontal drains (i.e., with the drains, the CCR is dry, and without the drains or outside of the area of the drains, the CCR remains wet). More specifically, the holes that were dug by the long reach excavator indicate that the use of horizontal prefabricated drains resulted in drier ash at deeper depths in a CCR pond in a faster more efficient manner than compared to other dewatering methods.

In some instances, CCR material in a CCR pond at a coal-fired power plant with wet flue gas desulfurization operations can be exceptionally difficult to dewater. For example, CCR would be considered difficult to dewater if, over the course of a day, vacuum consolidation dewatering (VCD) has no effect on dewatering the CCR. In such cases, the CCR plugged the prefabricated drain so that the material could not dewater because the water could not migrate through the CCR that was blinding the filtration action of the geotextile envelope surrounding the drain. In other words, the water could not migrate or be vacuumed through the fine CCR material to get to the prefabricated drain to be drawn out of the bench unit.

To solve this problem, the test was restarted, but first, enough CCR material that had previously been successfully dewatered was placed over the prefabricated drain, thereby providing a layer of material approximately two inches thick covering over the prefabricated drain in the bottom of the unit. This caused the easier-to-dewater material to provide a larger surface for the more difficult-to-dewater material to "spread out" and migrate into, rather than plug off the prefabricated drain as was obviously occurring in the sample where VCD was applied directly to the CCR. By locating the separate material (bottom ash, fly ash, sand, or large-diameter-solid particles—in this case bottom ash was used) over the prefabricated drain in this manner, the difficult-to-dewater CCR was successfully dewatered. Specifically, bottom ash was placed over the prefabricated drain to a depth of about two inches covering the drain. The difficult-to-dewater CCR was added to the unit on top of the bottom ash layer and the CCR was successfully dewatered whereas it could not be dewatered previously. This process allows the dewatering of CCR in a very efficient, effective and fast manner compared to other methods known in the art.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of drainage methods and systems available, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims."

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise. The term "connected" means "communicatively connected" unless otherwise defined.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of methods for system and method for dewatering coal combustion residuals known in the art, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

We claim:

1. A method for dewatering sediment in a sediment pond comprising:
   installing a plurality of co-planar drains within the sediment in an existing sediment pond, wherein each of the co-planar drains is installed after all sediment has been added to the sediment pond;
   applying vacuum pressure to the plurality of co-planar drains, thereby drawing water from the sediment through the plurality of co-planar drains.

2. The method of claim 1, wherein each of the plurality of co-planar drains are covered, at least in part, with a water-permeable geotextile material and water is drawn from the sediment through the water-permeable geotextile material and into the drains.

3. The method of claim 1, wherein each of the plurality of co-planar drains are, at least in part, perforated.

4. The method of claim 1, wherein each of the plurality of drains are fluidly connected to a device for applying the vacuum pressure.

5. The method of claim 1, wherein the plurality of co-planar drains underneath at least a portion of the sediment are installed by drilling horizontally through the sediment to install the drains.

6. The method of claim 1, wherein the plurality of co-planar drains underneath at least a portion of the sediment are installed by knifing through the sediment by trenching or plowing with mechanical equipment to install the drains.

7. The method of claim 1, wherein the plurality of co-planar drains underneath at least a portion of the sediment are installed by knifing through the sediment with water jets to install the drains.

8. The method of claim 1, wherein the plurality of the co-planar drains underneath at least a portion of the sediment are installed at a depth in the range of 1 to 20 ft. below the surface of the sediment.

9. The method of claim 1, wherein in addition to applying vacuum pressure to the plurality of co-planar drains, vibrational energy is applied to the surface of the sediment.

10. The method of claim 1, wherein in addition to applying vacuum pressure to the plurality of co-planar drains vibrational energy is applied to the surface of the sediment by driving machinery across the surface of the sediment to impart vibrations.

11. A method for dewatering sediment in a sediment pond comprising:
    installing a plurality of drains within the sediment in an existing sediment pond, wherein each of the drains is installed after all sediment has been added to the sediment pond;
    applying vacuum pressure to the plurality of drains, thereby drawing water from the sediment through the plurality of drains.

12. The method of claim 11, wherein each of the plurality of drains are covered, at least in part, with a water-permeable geotextile material and water is drawn from the sediment through the water-permeable geotextile material and into the drains.

13. The method of claim 11, wherein each of the plurality of drains are, at least in part, perforated.

14. The method of claim 11, wherein each of the plurality of drains are fluidly connected to a device for applying the vacuum pressure.

15. The method of claim 11, wherein the plurality of drains underneath at least a portion of the sediment are installed by drilling horizontally through the sediment to install the drains.

16. The method of claim 11, wherein the plurality of drains underneath at least a portion of the sediment are installed by knifing through the sediment by trenching or plowing with mechanical equipment to install the drains.

17. The method of claim 11, wherein the plurality of drains underneath at least a portion of the sediment are installed by knifing through the sediment with water jets to install the drains.

18. The method of claim 11, wherein the plurality of drains underneath at least a portion of the sediment are installed at a depth in the range of 1 to 20 ft. below the surface of the sediment.

19. The method of claim 11, wherein in addition to applying vacuum pressure to the plurality of drains, vibrational energy is applied to the surface of the sediment.

20. The method of claim 11, wherein in addition to applying vacuum pressure to the plurality of drains vibrational energy is applied to the surface of the sediment by driving the machinery across the surface of the sediment to impart vibrations.

21. A method for dewatering sediment in a sediment pond comprising:
   installing one drain, and no more than one drain, underneath at least a portion of the sediment in the sediment pond, wherein each of the co-planar drains is installed after all sediment has been added to the sediment pond;
   applying vacuum pressure to the drain, thereby drawing water from the sediment through the drain.

22. The method of claim 21, wherein the drain is covered, at least in part, with a water-permeable geotextile material and water is drawn from the sediment through the water-permeable geotextile material and water is drawn from the sediment through the water-permeable geotextile material and into the drain.

23. The method of claim 21, wherein the drain is, at least in part, perforated.

24. The method of claim 21, wherein the drain is fluidly connected to a device for applying vacuum pressure.

25. The method of claim 21, wherein the drain underneath at least a portion of the sediment is installed by drilling horizontally through the sediment to install the drain.

26. The method of claim 21, wherein the drain underneath at least a portion of the sediment is installed by knifing through the sediment by trenching or plowing with mechanical equipment to install the drain.

27. The method of claim 21, wherein the drain underneath at least a portion of the sediment is installed by knifing through the sediment with water jets to install the drain.

28. The method of claim 11, wherein the drain underneath at least a portion of the sediment is installed at a depth in the range of 1 to 20 ft. below the surface of the sediment.

29. The method of claim 21, wherein in addition to applying vacuum pressure to the drain, vibrational energy is applied to the surface of the sediment.

30. The method of claim 21, wherein in addition to applying vacuum pressure to the drain, vibrational energy is applied to the surface of the sediment by driving machinery across the surface of the sediment to impart vibrations.

* * * * *